US010178370B2

(12) United States Patent
Shintani et al.

(10) Patent No.: US 10,178,370 B2
(45) Date of Patent: Jan. 8, 2019

(54) USING MULTIPLE CAMERAS TO STITCH A CONSOLIDATED 3D DEPTH MAP

(71) Applicants: Sony Corporation, Tokyo (JP); Sony Interactive Entertainment Inc., Tokyo (JP)

(72) Inventors: Peter Shintani, San Diego, CA (US); Jose Omar Gonzalez Hernandez, Chula Vista, CA (US); William Clay, San Diego, CA (US); Pablo Antonio Espinosa, San Diego, CA (US); Fred Ansfield, San Diego, CA (US); Bibhudendu Mohapatra, San Diego, CA (US); Keith Resch, San Diego, CA (US); Morio Usami, Tokyo (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 71 days.

(21) Appl. No.: 15/383,683

(22) Filed: Dec. 19, 2016

(65) Prior Publication Data
US 2018/0176530 A1    Jun. 21, 2018

(51) Int. Cl.
*H04N 13/156* (2018.01)
*H04N 13/204* (2018.01)
(Continued)

(52) U.S. Cl.
CPC .......... *H04N 13/156* (2018.05); *G01B 11/00* (2013.01); *H04N 5/33* (2013.01); *H04N 13/204* (2018.05); *H04N 13/271* (2018.05)

(58) Field of Classification Search
CPC ............... A61C 19/04; H04N 13/0239; H04N 13/02543; H04N 5/226
(Continued)

(56) References Cited

U.S. PATENT DOCUMENTS 6,291,816 B1    9/2001  Liu
6,420,698 B1    7/2002  Dimsdale
(Continued)

FOREIGN PATENT DOCUMENTS

| EP | 2225699 A1 | 9/2010 |
|---|---|---|
| EP | 2730939 A2 | 5/2014 |
| EP | 2339532 B1 | 4/2015 |

OTHER PUBLICATIONS

Daniel Freedman, Eyal Krupka, Yoni Smolin, Ido Leichter, Mirko Schmidt, "SRA: Fast Removal of General Multipath for ToF Sensors", Microsoft Research, Microsoft Corporation, Mar. 24, 2014.
(Continued)

*Primary Examiner* — Anand S Rao
(74) *Attorney, Agent, or Firm* — John L. Rogitz

(57) ABSTRACT

Each of plural devices includes a laser emitter and a camera for detecting reflections of laser light emitted by the device, so that plural of the devices can generate their own depth maps showing images within the field of view of their cameras. The resulting 3D depth maps from multiple cameras at potentially arbitrary locations can be aggregated to create a more accurate 3D depth map of the area covered by all the individual cameras. Each device/camera may be assigned a unique identification such as a unique number and a mechanism to identify, either electronically or visually, devices in its field of view. Using this information, the relative locations of the cameras can be calculated for purposes of aggregating the multiple depth maps.

20 Claims, 7 Drawing Sheets

(51) Int. Cl.
  *H04N 13/271* (2018.01)
  *G01B 11/00* (2006.01)
  *H04N 5/33* (2006.01)
(58) Field of Classification Search
  USPC .................................... 348/42–61, 135–139
  See application file for complete search history.

(56) References Cited

U.S. PATENT DOCUMENTS

| | | | |
|---|---|---|---|
| 6,442,465 | B2 | 8/2002 | Breed et al. |
| 6,970,183 | B1 | 11/2005 | Monroe |
| 7,752,483 | B1 | 7/2010 | Muresan et al. |
| 7,791,009 | B2 | 9/2010 | Johnston et al. |
| 8,730,309 | B2 | 5/2014 | Wilson et al. |
| 8,830,555 | B2 | 9/2014 | Aksamit et al. |
| 9,031,356 | B2 | 5/2015 | Kunkel et al. |
| 9,098,908 | B2 | 8/2015 | Kirk et al. |
| 9,214,492 | B2 | 12/2015 | Tempel et al. |
| 9,235,928 | B2 | 1/2016 | Medioni et al. |
| 9,275,302 | B1 | 3/2016 | Yan et al. |
| 9,286,694 | B2 | 3/2016 | Kim et al. |
| 9,319,139 | B2 | 4/2016 | Effenberger et al. |
| 9,405,008 | B2 | 8/2016 | Raskar et al. |
| 9,435,891 | B2 | 9/2016 | Oggier |
| 9,542,749 | B2 | 1/2017 | Freedman et al. |
| 9,557,166 | B2 | 1/2017 | Thuries et al. |
| 9,760,837 | B1 | 9/2017 | Nowozin et al. |
| 9,806,813 | B2 | 10/2017 | Liu et al. |
| 9,860,618 | B2 | 1/2018 | Liu et al. |
| 2004/0141753 | A1 | 7/2004 | Euw et al. |
| 2004/0208272 | A1 | 10/2004 | Moursund et al. |
| 2005/0207755 | A1 | 9/2005 | Rabbat et al. |
| 2006/0239558 | A1 | 10/2006 | Rafii et al. |
| 2007/0024614 | A1 | 2/2007 | Tam et al. |
| 2007/0279415 | A1 | 12/2007 | Sullivan et al. |
| 2009/0080885 | A1 | 3/2009 | Mehrotra et al. |
| 2010/0302365 | A1 | 12/2010 | Finocchio et al. |
| 2011/0188773 | A1 | 8/2011 | Wei et al. |
| 2011/0243570 | A1 | 10/2011 | Kim et al. |
| 2012/0069009 | A1 | 3/2012 | Shimoyama et al. |
| 2012/0182394 | A1 | 7/2012 | Bae et al. |
| 2012/0306876 | A1 | 12/2012 | Shotton et al. |
| 2013/0129224 | A1 | 5/2013 | Katz et al. |
| 2013/0207970 | A1 | 8/2013 | Shpunt et al. |
| 2013/0278604 | A1 | 10/2013 | Georgis et al. |
| 2013/0329012 | A1 | 12/2013 | Bartos et al. |
| 2014/0092221 | A1 | 4/2014 | Nagai |
| 2014/0240467 | A1 | 8/2014 | Petyushko et al. |
| 2014/0253679 | A1 | 9/2014 | Guigues et al. |
| 2014/0253691 | A1 | 9/2014 | Holz |
| 2014/0293993 | A1 | 10/2014 | Ryhorchuk |
| 2014/0333728 | A1 | 11/2014 | Navab et al. |
| 2014/0355901 | A1 | 12/2014 | Tezaur |
| 2014/0376768 | A1 | 12/2014 | Troy et al. |
| 2015/0022643 | A1 | 1/2015 | Stetson et al. |
| 2015/0024336 | A1* | 1/2015 | Blassnig ............... G06T 15/06 433/29 |
| 2015/0171968 | A1 | 6/2015 | Featherston et al. |
| 2015/0248765 | A1 | 9/2015 | Criminisi et al. |
| 2015/0309663 | A1 | 10/2015 | Seo et al. |
| 2015/0371393 | A1 | 12/2015 | Ramachandra et al. |
| 2015/0373322 | A1 | 12/2015 | Goma et al. |
| 2015/0378023 | A1 | 12/2015 | Royo et al. |
| 2016/0099777 | A1 | 4/2016 | Liu et al. |
| 2016/0124089 | A1 | 5/2016 | Meinherz et al. |
| 2016/0191759 | A1 | 6/2016 | Somanath et al. |
| 2016/0239725 | A1 | 8/2016 | Liu et al. |
| 2016/0328828 | A1 | 11/2016 | Zhang et al. |
| 2017/0061701 | A1 | 3/2017 | Mittal et al. |
| 2017/0372527 | A1 | 12/2017 | Murali et al. |
| 2018/0034579 | A1 | 2/2018 | Liu et al. |

OTHER PUBLICATIONS

Peter Shintani, Morio Usami, Kazuyuki Shikama, Keith Resch, "Generating 3D Depth Map Using Parallax", file history of related U.S. Appl. No. 15/798,914, filed Oct. 31, 2017.
Prepared and filed an IDS on Feb. 16, 2017 disclosing the references cited in, and the file history of, related application 201605652.01 (1168-876) U.S. Appl. No. 15/432,674.
Riegler et al., "A Deep Primal-Dual Network for Guided Depth Super-Resolution", Institute for Computer Graphics and Vision, Graz University of TechnologyAustria, Jul. 28, 2016.
Schuon et al., "High-Quality Scanning Using Time-of-Flight Depth Superresolution", Stanford University, 2008.
Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", file history of related U.S. Appl. No. 15/477,369, filed Apr. 3, 2017.
Ho, Edmond S.L. et al., "Improving Posture Classification Accuracy for Depth Sensor-Based Human Activity Monitoring in Smart Environments", Jul. 2016, retrieved from http://www.sciencedirect.com/science/article/pii/S1077314216000138.
Peter Shintani, Morio Usami, Kissei Matsumoto, Kazuyuki Shikama, Bibhudendu Mohapatra, Keith Resch, "3D Depth Map", file history of related U.S. Appl. No. 15/590,497, filed May 9, 2017.
Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", related U.S. Appl. No. 15/477,369, Non-Final Office Action dated Jun. 21, 2018.
Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", related U.S. Appl. No. 15/477,369, Applicant's response to Non-Final Office Action filed Jun. 27, 2018.
Peter Shintani, Morio Usami, Kissei Matsumoto, Kazuyuki Shikama, Bibhudendu Mohapatra, Keith Resch, "3D Depth Map", related U.S. Appl. No. 15/590,497, Non-Final Office Action dated Jun. 15, 2018.
Peter Shintani, Morio Usami, Kissei Matsumoto, Kazuyuki Shikama, Bibhudendu Mohapatra, Keith Resch, "3D Depth Map", related U.S. Appl. No. 15/590,497, Applicant's response to Non-Final Office Action filed Jun. 20, 2018.
Peter Shintani, Jose Omar Gonzalez Hernandez, William Clay, Pablo Antonio Espinosa, Fred Ansfield, Bibhudendu Mohapatra, Keith Resch, Morio Usami, "Optical Micromesh for Computerized Devices", related U.S. Appl. No. 15/370,197, Non-Final Office Action dated Apr. 5, 2018.
Peter Shintani, Jose Omar Gonzalez Hernandez, William Clay, Pablo Antonio Espinosa, Fred Ansfield, Bibhudendu Mohapatra, Keith Resch, Morio Usami, "Optical Micromesh for Computerized Devices", related U.S. Appl. No. 15/370,197, Applicant's response to Non-Final Office Action filed Apr. 16, 2018.
Peter Shintani, Jose Omar Gonzalez Hernandez, William Clay, Pablo Antonio Espinosa, Fred Ansfield, Bibhudendu Mohapatra, Keith Resch, Morio Usami, "Using Pattern Recognition to Reduce Noise in a 3D Map", related U.S. Appl. No. 15/383,392, Non-Final Office Action dated Apr. 19, 2018.
Peter Shintani, Jose Omar Gonzalez Hernandez, William Clay, Pablo Antonio Espinosa, Fred Ansfield, Bibhudendu Mohapatra, Keith Resch, Morio Usami, "Using Pattern Recognition to Reduce Noise in a 3D Map", related U.S. Appl. No. 15/383,392, Applicant's response to Non-Final Office Action filed Apr. 25, 2018.
Nathan Silberman, Rob Fergus, "Indoor Scene Segmentation using a Structured Light Sensor", Dept. of Computer Science, Nov. 6, 2011, Courant Institute, New York University, pp. 601-608.
Derek Chan, Hylke Buisman, Christian Theobalt, Sebastian Thrun, "A Noise-Aware Filter for Real-Time Depth Upsampling", Oct. 5, 2008, retrieved from https://hal.inria.fr/inria-00326784.
Quang H. Nguyen, Minh N. Do, Sanjay J. Patel, "Depth image-based rendering from multiple cameras with 3D propagation algorithm", May 27, 2009.
Shuran Song, Jianxiong Xiao, "Sliding Shapes for 3D Object Detection in Depth Images", Abstract, Sep. 2014.

(56) References Cited

OTHER PUBLICATIONS

Yo-Sung Ho, Yun-Suk Kang, "Multi-View Depth Generation using Multi-Depth Camera System", Gwangju Institute of Science and Technology, Jan. 4, 2016.

Peter Shintani, Jose Omar Gonzalez Hernandez, William Clay, Pablo Antonio Espinosa, Fred Ansfield, Bibhudendu Mohapatra, Keith Resch, Morio Usami, "Using Pattern Recognition to Reduce Noise in a 3D Map", file history of related U.S. Appl. No. 15/383,392, filed Dec. 19, 2016.

Peter Shintani, Jose Omar Gonzalez Hernandez, William Clay, Pablo Antonio Espinosa, Fred Ansfield, Bibhudendu Mohapatra, Keith Resch, Morio Usami, "Optical Micromesh for Computerized Devices", file history of related U.S. Appl. No. 15/370,197, filed Dec. 6, 2016.

Peter Shintani, Jose Omar Gonzalez Hernandez, William Clay, Pablo Antonio Espinosa, Fred Ansfield, Bibhudendu Mohapatra, Keith Resch, Morio Usami, "Color Noise Reduction in 3D Depth Map", file history of related U.S. Appl. No. 15/371,433, filed Dec. 7, 2016.

Michael Taylor, Glenn Black, Javier Fernandez Rico, "Multipoint Slam Capture", file history of related U.S. Appl. No. 16/019,140, filed Jun. 26, 2018.

Peter Shintani, Jose Omar Gonzalez Hernandez, William Clay, Pablo Antonio Espinosa, Fred Ansfield, Bibhudendu Mohapatra, Keith Resch, Morio Usami, "Optical Micromesh for Computerized Devices", related U.S. Appl. No. 15/370,197, Final Office Action dated Sep. 10, 2018.

Peter Shintani, Jose Omar Gonzalez Hernandez, William Clay, Pablo Antonio Espinosa, Fred Ansfield, Bibhudendu Mohapatra, Keith Resch, Morio Usami, "Optical Micromesh for Computerized Devices", related U.S. Appl. No. 15/370,197, Applicant's response to Final Office Action filed Sep. 12, 2018.

Peter Shintani, Jose Omar Gonzalez Hernandez, William Clay, Pablo Antonio Espinosa, Fred Ansfield, Bibhudendu Mohapatra, Keith Resch, Morio Usami, "Using Pattern Recognition to Reduce Noise in a 3D Map", related U.S. Appl. No. 15/383,392, Final Office Action dated Sep. 12, 2018.

Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", related U.S. Appl. No. 15/477,369, Final Office Action dated Aug. 23, 2018.

Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", related U.S. Appl. No. 15/477,369, Applicant's response to Final Office Action filed Sep. 4, 2018.

Peter Shintani, Jose Omar Gonzalez Hernandez, William Clay, Pablo Antonio Espinosa, Fred Ansfield, Bibhudendu Mohapatra, Keith Resch, Morio Usami, "Using Pattern Recognition to Reduce Noise in a 3D Map", related U.S. Appl. No. 15/383,392, Applicant's response to Final Office Action filed Sep. 14, 2018.

* cited by examiner

USING MULTIPLE CAMERAS TO STITCH A CONSOLIDATED 3D DEPTH MAP

FIELD

The present application relates to technically inventive, non-routine solutions that are necessarily rooted in computer technology and that produce concrete technical improvements.

BACKGROUND

When multiple computerized devices interact with each other at close range, they may employ sensors such as cameras and laser range finders to map their environment. As understood herein, three dimensional (3D) depth maps may be generated by each device of the other devices or objects within line of sight. Such 3D depth maps are generated typically using "time of flight" principles, i.e., by timing the periods from laser transmission to reception of each reflection, with regions of an object further away taking longer for the light to propagate to it and then return to a detector. The time of flight for each detected reflection by a sensor, typically a complementary metal oxide semiconductor (CMOS) camera, is converted to distance to generate the depth map.

As understood herein, a problem with time of flight 3D camera mapping systems is the illumination of the camera's field of view by a laser. As the distance increases (depth), the reflected laser power drops so the noise increases. This means that the accuracy of the depth map decreases and the measurement time increases (averaging). A brute force response to this problem would be to increase the illumination by increasing the laser power, but this method raises safety issues and power consumption issues.

SUMMARY

As envisioned herein, a system of multiple independent computer devices which may or may not be mobile can be used in an example indoor setting, potentially on a flat surface. Each device may include a laser emitter and a camera for detecting reflections of laser light emitted by the device, so that plural of the devices can generate their own depth maps showing images within the field of view of their cameras. The 3D depth maps from multiple cameras at potentially arbitrary locations can be aggregated to create a more accurate 3D depth map of the area covered by all the individual cameras.

Because GPS cannot feasibly be used to determine the individual camera locations of the individual devices, present principles recognize that the cameras can image several other devices/cameras in the system. Each device/camera may be assigned a unique identification such as a unique number and a mechanism to identify, either electronically or visually, devices in its field of view. Using this information, the relative locations of the cameras can be calculated for purposes of aggregating the multiple depth maps.

Accordingly, in one aspect a device includes at least one computer medium that is not a transitory signal and that in turn includes instructions executable by at least one processor to generate, using a first device, at least a first image of second and third devices in a field of view of a camera. The first image is a first 3D depth map. The instructions are executable to receive from at least one of the second and third devices information useful for generating a second 3D depth map including an image of the first device, and to generate an aggregate 3D depth map using the first and second 3D depth maps. A method and a multi-device assembly incorporating these principles are also disclosed.

In example embodiments the instructions can be executable to exchange device identifying information with the second and third devices. The information useful for generating a second 3D depth map can include the device identifying information, and the first and second 3D depth maps may be generated by a single camera located in respective first location and second locations. Or, the information useful for generating a second 3D depth map may include an image of the first device taken by the second device.

In some example embodiments the instructions can be executable to receive from at least one of the second and third devices information useful for generating a third 3D depth map including an image of the first device, and to generate an aggregate 3D depth map using the first, second, and third 3D depth maps. If desired, the instructions may be executable to determine a distance to a device corresponding to an image in the first 3D depth map at least in part based on a size of the image. Example implementations envision the instructions being executable to alter aspects of images in the first and second 3D depth maps for a reference location to render altered images in the aggregate 3D depth map.

The details of the present application, both as to its structure and operation, can be best understood in reference to the accompanying drawings, in which like reference numerals refer to like parts, and in which:

DETAILED DESCRIPTION

Figure 1:
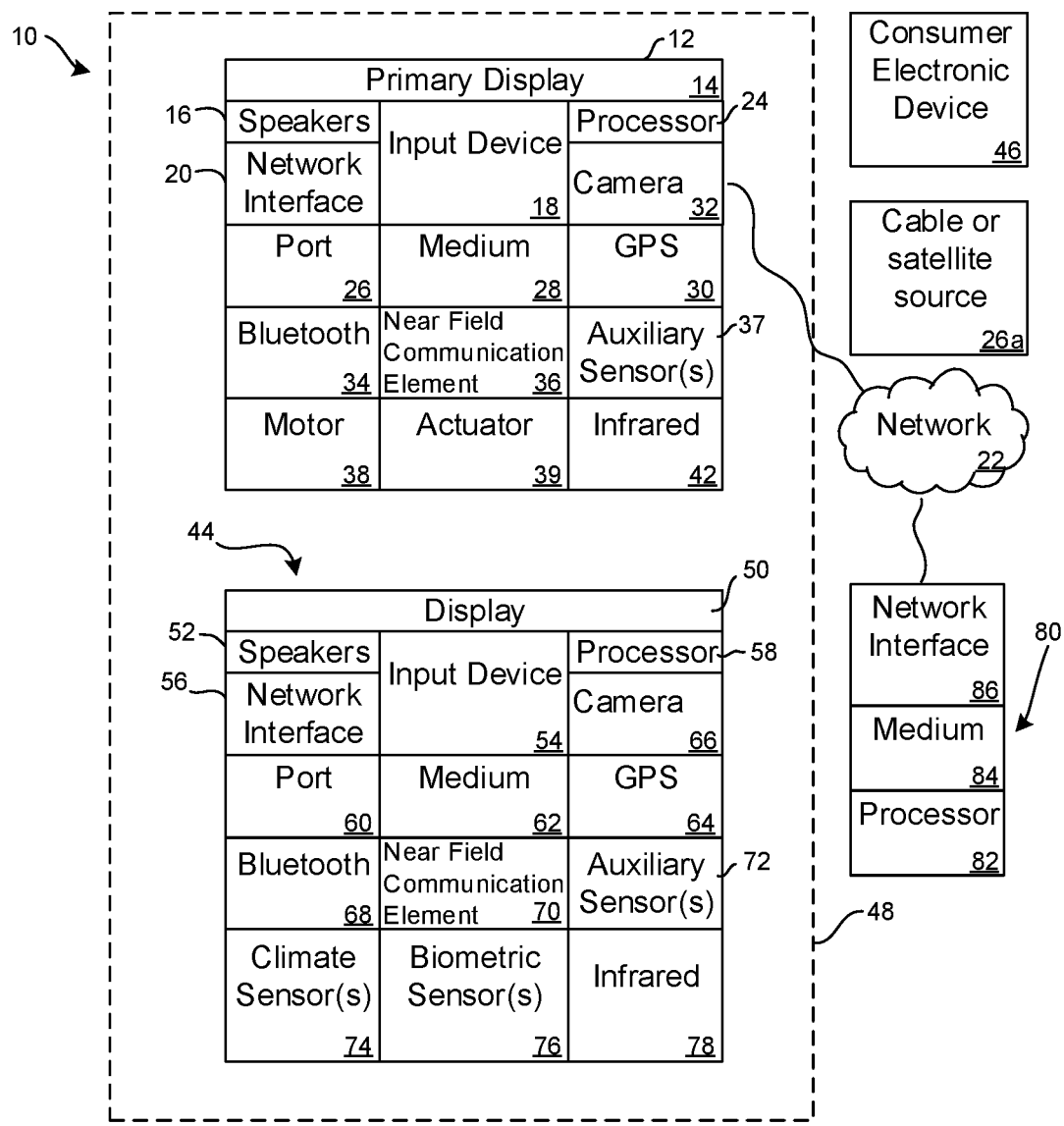
FIG. 1 is a block diagram of an example device.

This disclosure relates generally to computer ecosystems including aspects of multiple computerized devices. A system herein including computerized devices may include server and client components, connected over a network such that data may be exchanged between the client and server components. The client components may include one or more computing devices such as portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community including but not limited to social networks to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers. A processor may be implemented by a digital signal processor (DSP), for example.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optic and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is an example computerized device 12.

The computerized device 12 may be an Android®-based system. The computerized device 12 alternatively may also include a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the computerized device 12 and/or other computers described herein is configured to undertake present principles (e.g. communicate with other CE devices to undertake present principles, execute the logic described herein, and perform any other functions and/or operations described herein).

Accordingly, to undertake such principles the computerized device 12 can be established by some or all of the components shown in FIG. 1. For example, the computerized device 12 can include one or more displays 14 that may be implemented by a high definition or ultra-high definition "4K" or higher flat screen and that may or may not be touch-enabled for receiving user input signals via touches on the display. The computerized device 12 may include one or more speakers 16 for outputting audio in accordance with present principles, and at least one additional input device 18 such as e.g. an audio receiver/microphone for receiving input sound including but not limited to audible commands to the computerized device 12 to control the computerized device 12. The example computerized device 12 may also include one or more network interfaces 20 for communication over at least one network 22 such as the Internet, a WAN, a LAN, a PAN etc. under control of one or more processors 24. Thus, the interface 20 may be, without limitation, a Wi-Fi transceiver, which is an example of a wireless computer network interface, such as but not limited to a mesh network transceiver. The interface 20 may be, without limitation a Bluetooth transceiver, Zigbee transceiver, IrDA transceiver, Wireless USB transceiver, wired USB, wired LAN, Powerline or MoCA. It is to be understood that the processor 24 controls the computerized device 12 to undertake present principles, including the other elements of the computerized device 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the computerized device 12 may also include one or more input ports 26 such as, e.g., a high definition multimedia interface (HDMI) port or a USB port to physically connect (e.g. using a wired connection) to another CE device and/or a headphone port to connect headphones to the computerized device 12 for presentation of audio from the computerized device 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignment purposes described further below.

The computerized device 12 may further include one or more computer memories 28 such as disk-based or solid state storage that are not transitory signals, in some cases embodied in the chassis of the device as standalone devices or as a personal video recording device (PVR) or video disk player either internal or external to the chassis of the device for playing back AV programs or as removable memory media. Also in some embodiments, the computerized device 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the computerized device 12 is disposed in conjunction with the processor 24. However, it is to be understood that that another suitable position receiver other than a cellphone receiver, GPS receiver and/or altimeter may be used in accordance with present principles to e.g. determine the location of the computerized device 12 in e.g. all three dimensions.

In some embodiments the computerized device 12 may include one or more cameras 32 that may be, e.g., a thermal imaging camera, a digital camera such as a webcam, and/or a camera integrated into the computerized device 12 and controllable by the processor 24 to gather pictures/images and/or video in accordance with present principles. Also included on the computerized device 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the computerized device 12 may include one or more auxiliary sensors 37 (e.g., a motion sensor such as an accelerometer, gyroscope, cyclometer, or a magnetic sensor, an infrared (IR) sensor for receiving IR commands or other signals from a remote control or laser, an optical sensor, a speed and/or cadence sensor, a gesture sensor (e.g. for sensing gesture command), etc.) providing input to the processor 24. The computerized device 12 may include one or more motors 38, which may be a battery-powered motor, and one or more actuators 39 coupled to the motor 38 and configured to cause the device 12 to ambulate. In one example, the actuator 39 is a simple axle-and-wheel actuator that can be energized by the motor 38 to cause the device 12 to roll across a surface. In another example the actuator 39 may include one or more linear actuators with joints to cause the device 12 to move in a robotic, walking-type fashion on multiple legs. These are but two examples of motion actuators that can be included in the device 12.

In addition to the foregoing, it is noted that the computerized device 12 may also include an infrared (IR) transmitter and/or IR receiver and/or IR transceiver 42 such as a laser or an IR data association (IRDA) device. A battery (not shown) may be provided for powering the computerized device 12.

Still referring to FIG. 1, in addition to the computerized device 12, the system 10 may include one or more other computer device types that may include some or all of the components shown for the computerized device 12 and that may wirelessly communicate with the device 12 to control it. In one example, a first device 44 and a second device 46 are shown and may include similar components as some or all of the components of the computerized device 12. Fewer or greater devices may be used than shown.

In the example shown, to illustrate present principles all three devices 12, 44, 46 are assumed to be members of a local network in, e.g., a dwelling 48, illustrated by dashed lines.

The example non-limiting first device 44 may include one or more touch-sensitive surfaces 50 such as a touch-enabled video display for receiving user input signals via touches on the display. The first device 44 may include one or more speakers 52 for outputting audio in accordance with present principles, and at least one additional input device 54 such as e.g. an audio receiver/microphone for e.g. entering audible commands to the first device 44 to control the device 44. The example first device 44 may also include one or more network interfaces 56 for communication over the network 22 under control of one or more processors 58. Thus, the interface 56 may be, without limitation, a Wi-Fi transceiver, which is an example of a wireless computer network interface, including mesh network interfaces. It is to be understood that the processor 58 controls the first device 44 to undertake present principles, including the other elements of the first device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first device 44 may also include one or more input ports 60 such as, e.g., a HDMI port or a USB port to physically connect (e.g. using a wired connection) to another computer device and/or a headphone port to connect headphones to the first device 44 for presentation of audio from the first device 44 to a user through the headphones. The first device 44 may further include one or more tangible computer readable storage medium 62 such as disk-based or solid state storage. Also in some embodiments, the first device 44 can include a position or location receiver such as but not limited to a cellphone and/or GPS receiver and/or altimeter 64 that is configured to e.g. receive geographic position information from at least one satellite and/or cell tower, using triangulation, and provide the information to the device processor 58 and/or determine an altitude at which the first device 44 is disposed in conjunction with the device processor 58. However, it is to be understood that that another suitable position receiver other than a cellphone and/or GPS receiver and/or altimeter may be used in accordance with present principles to e.g. determine the location of the first device 44 in e.g. all three dimensions.

Continuing the description of the first device 44, in some embodiments the first device 44 may include one or more cameras 66 that may be, e.g., a thermal imaging camera, a digital camera such as a webcam, etc. Also included on the first device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first device 44 may include still other sensors such as e.g. one or more climate sensors 74 (e.g. barometers, humidity sensors, wind sensors, light sensors, temperature sensors, etc.) and/or one or more biometric sensors 76 providing input to the device processor 58. In addition to the foregoing, it is noted that in some embodiments the first device 44 may also include an infrared (IR) transmitter and/or IR receiver and/or IR transceiver 78 such as a laser or an IR data association (IRDA) device. A battery may be provided for powering the first device 44. The device 44 may communicate with the computerized device 12 through any of the above-described communication modes and related components.

The second device 46 may include some or all of the components described above.

Now in reference to the afore-mentioned at least one server 80, it includes at least one server processor 82, at least one computer memory 84 such as disk-based or solid state storage, and at least one network interface 86 that, under control of the server processor 82, allows for communication with the other devices of FIG. 1 over the network 22, and indeed may facilitate communication between servers, controllers, and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
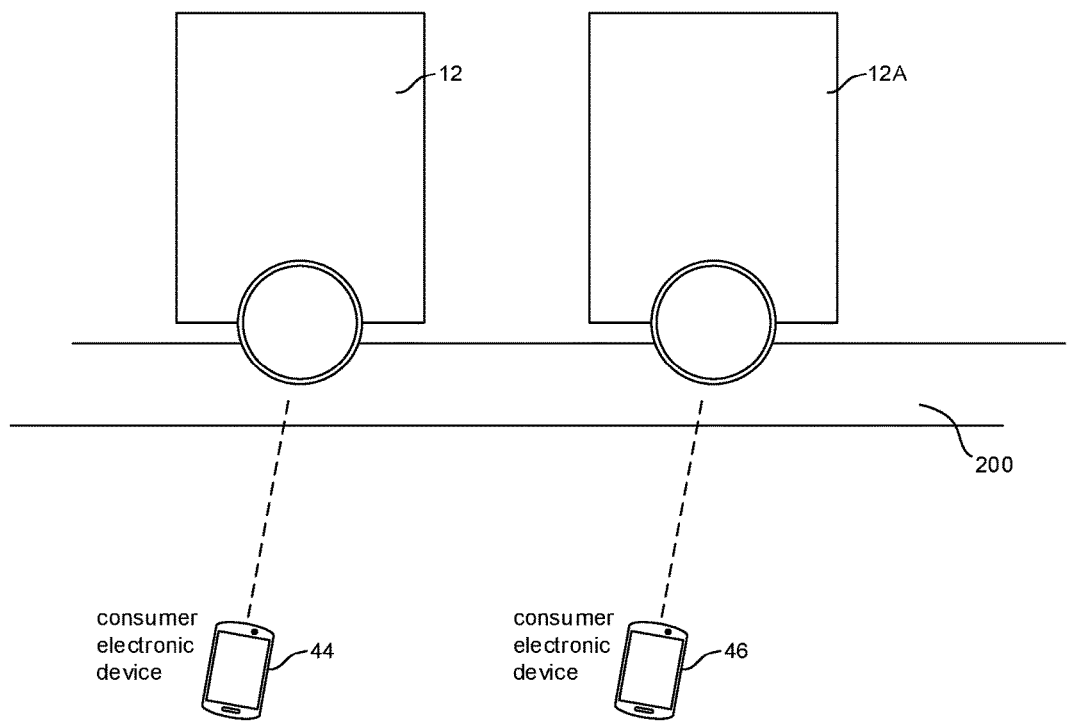
FIG. 2 is a block diagram of a system showing two devices, it being understood that more than two devices may be used.

FIG. 2 shows that multiple devices 12, 12A may be controlled by respective CE devices 44, 46 to interact on a surface 200 such as a flat planar surface.

Figure 3:
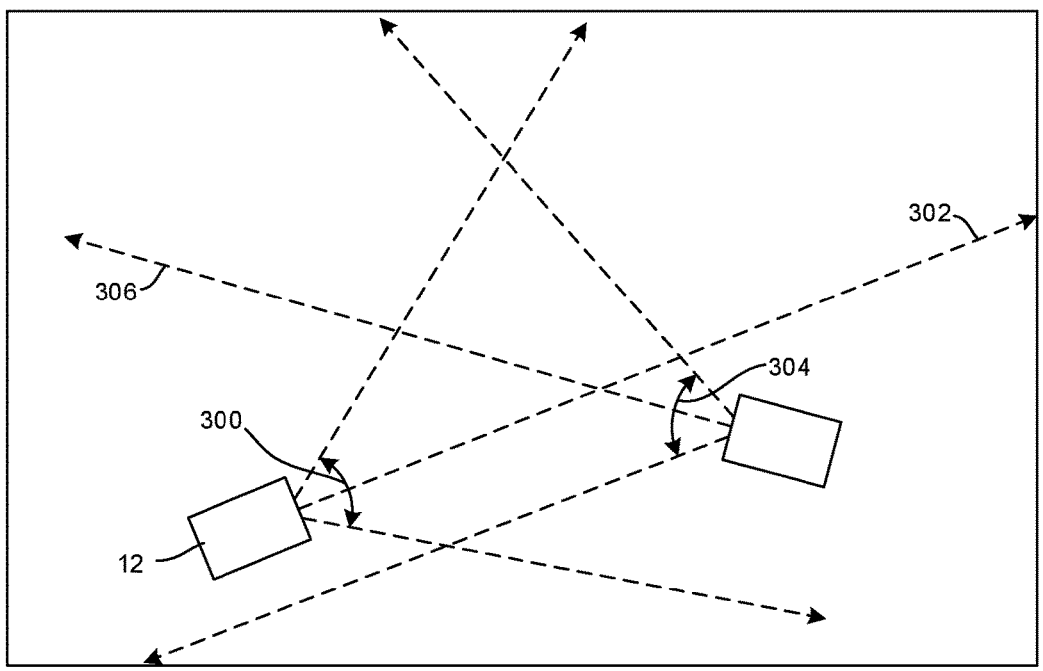
FIG. 3 is a schematic top view of two devices showing field of view of the devices.

FIG. 3 shows that the first device 12 may have a camera providing a field of view (FOV) with a FOV angle 300. The first device 12 may emit laser range-finding light such as IR light along one or more range finding axes 302. The camera may be implemented by a complementary metal oxide semiconductor (CMOS) camera that can detect both visible and infrared light so as to be able to produce still or video images along with detections of laser reflections for purposes of generating a depth map.

Likewise, the second device 12A may have a camera providing a field of view (FOV) with a FOV angle 304. The first device 12 may emit laser range-finding light such as IR light along one or more range finding axes 306. More than two devices may be used. In the example shown, each device is within the FOV of the other device, and the FOVs of the devices overlap as shown. The devices 12, 12A emitting their respective laser beams establish an optical micro-mesh.

Figure 4:
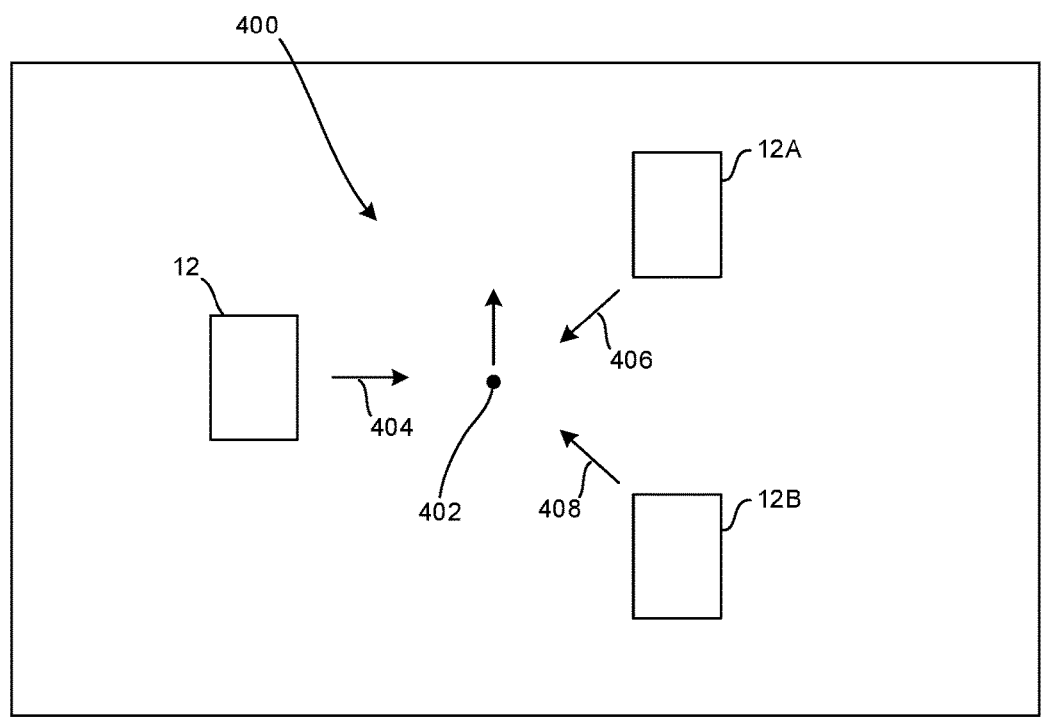
FIG. 4 is a schematic top view of three devices.

FIG. 4 illustrates a system 400 with three devices 12, 12A, 12B implemented by any of the devices described herein. As divulged further below, each device generates its own depth map by imaging the other devices within its field of view. The depth maps are aggregated together for a reference location that may be user-defined. In the example shown, the disclosure below assumes a reference location 402 located centrally in the system 400. Other reference locations may be modeled, including using one of the devices 12, 12A, 12B as a reference location. For description purposes, assume that the arrows 404, 406, 408 respectively represent the centerline axis of the field of view of each device 12, 12A, 12B.

Figure 5:
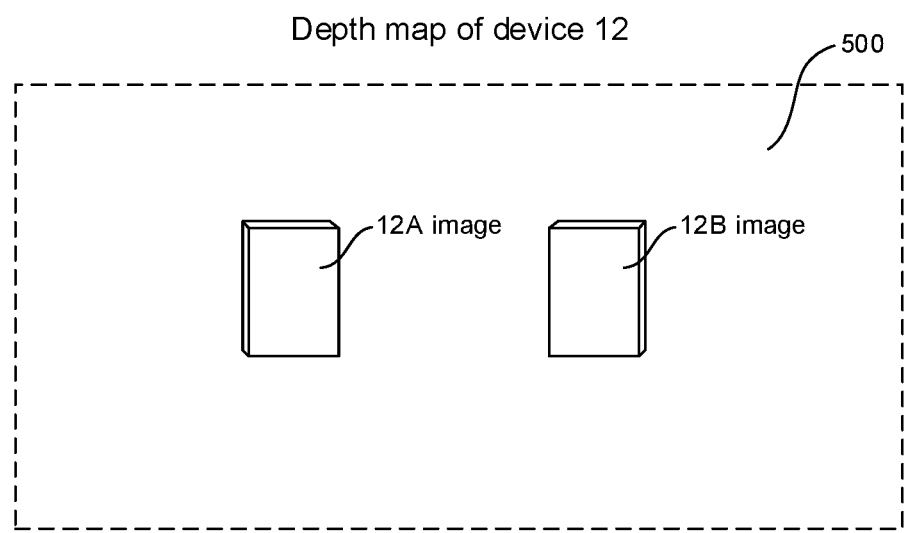
FIG. 5 schematically shows a depth map as generated by a first device in FIG. 4.
Figure 6:
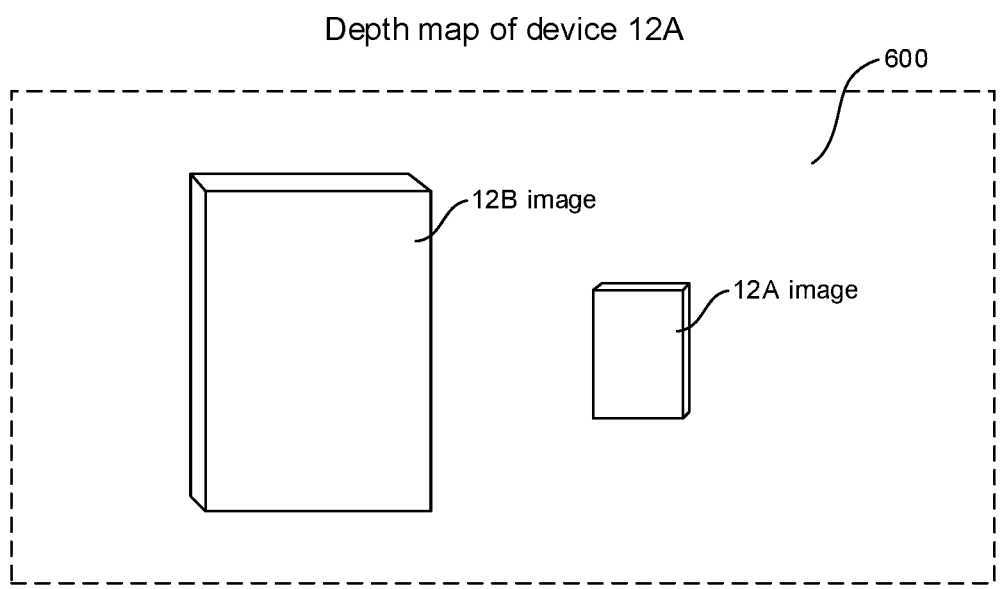
FIG. 6 schematically shows a depth map as generated by a second device in FIG. 4.
Figure 7:
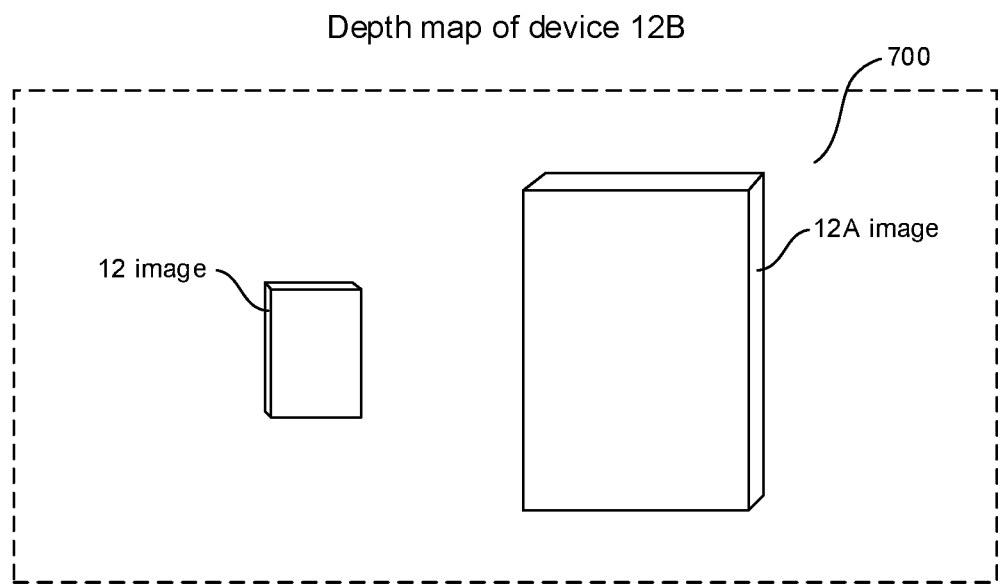
FIG. 7 schematically shows a depth map as generated by a third device in FIG. 4.

With the above description of FIG. 4 in mind, FIGS. 5-7 respectively show depth maps 500, 600, 700 generated by each device 12, 12A, 12B of the other devices in its FOV. Some of the images are larger than others because the device corresponding to the larger image is closer to the imaging device than the device corresponding to the smaller image. The depth maps can be 3D depth maps as shown, and the relative locations of the devices are known to the other devices according to further description below. Thus, each depth map includes not only the images of the other devices but their relative locations with respect to the imaging device, which knows the direction its respective centerline axis is in and thus the angular offset of each image from that centerline axis. The absolute locations of the devices may be determined if desired using, e.g., the absolute location of any one of the devices using, for instance, its GPS location.

Distance to each imaged device may be determined by correlating the size of its image to distance. For example, since the size of each device can be known and preprogrammed into each of the devices, a reference image size, e.g., height, can be correlated with a reference distance. Linear interpolation can be used to then associate smaller image sizes than the reference size with greater distances than the reference distance and larger image sizes than the reference size with lesser distances than the reference distance.

Figure 8:
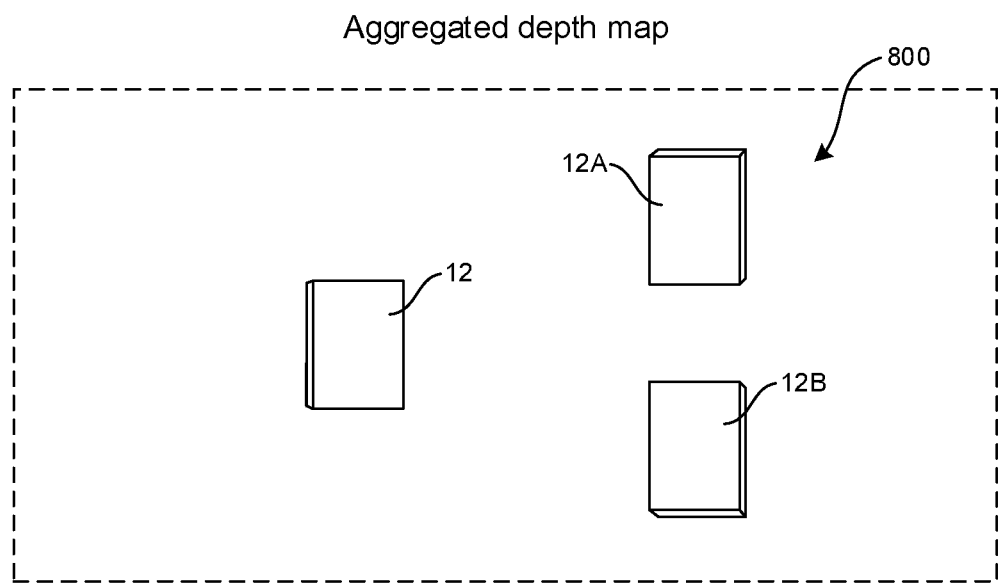
FIG. 8 schematically shows an aggregate depth map generated using the depth maps of FIGS. 5-7.

The depth maps 500, 600, 700 are aggregated into a single aggregate depth map 800 referenced to the reference location 402 in FIG. 4. The aspects of each image in the aggregate depth map 800 are altered as appropriate for the angle and distance each device is from the reference location 402. This may be done because each of the three devices in the example shown is present in two of the three depth maps, and presents a different aspect in each depth map the device appears in. One or more of the processors described herein can execute a graphics engine to access the multiple aspects of each imaged device and present a single image of the device with the aspect it would present when viewed from the reference point 402, as shown in the aggregated depth map 800 of FIG. 8.

Figure 9:
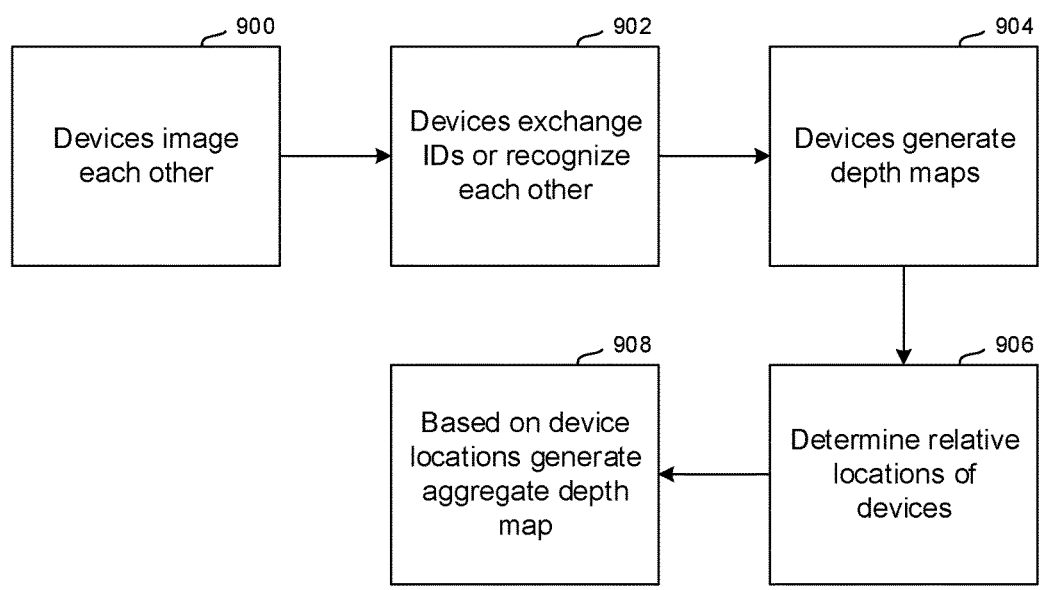
FIG. 9 is a flow chart of example logic for generating an aggregated depth map.

FIG. 9 illustrates further. Commencing at block 900, the devices 12, 12A, 12B image each other and at block 902 may exchange identifications or otherwise recognize each other using image recognition, so that each device can know the, e.g., the size of the other devices (based on ID) and the relative locations of the devices relative to the imaging device. Additionally, if desired one or more objects in the field of view of each camera can be used to help stitch the images together by referencing specific/common points. In other words, the devices can exchange information such as image information or image recognition information derived from executing image recognition algorithms on the image to inform other devices of one or more non-CE device objects (such as, e.g., a pen, a projector, a chair, etc.) in the FOV of the device. Each device may then compare the received information from other devices to determine if the same object(s) are in its FOV and in this way use commonly recognized objects as reference points in knowing what the FOV of the other device cameras is.

At block 904 the depth maps 500-700 are generated by the respective devices by imaging reflections of the ranging laser light. The locations of the devices are determined at block 906 using example principles above, and based on the device locations and the reference location for the aggregated depth map, the aggregated depth map 800 is generated as described above.

In another embodiment, synthetic 3D depth mapping may be executed using the principles above, except that instead of using multiple cameras, a single camera is used to generate a 3D depth map in a first location, then moved to other locations to generate additional 3D depth maps of the same object, with the various depth maps being stitched together.

While particular techniques and machines are herein shown and described in detail, it is to be understood that the subject matter which is encompassed by the present invention is limited only by the claims.

What is claimed is:

1. A device comprising:
    at least one computer medium that is not a transitory signal and that comprises instructions executable by at least one processor to:
    generate, using a first device, at least a first image of second and third devices in a field of view of a camera; the first image being a first 3D depth map;
    receive from at least one of the second and third devices information useful for generating a second 3D depth map including an image of the first device; and
    generate an aggregate 3D depth map using the first and second 3D depth maps.

2. The device of claim 1, wherein the instructions are executable to:
    exchange device identifying information with the second and third devices.

3. The device of claim 1, wherein the information useful for generating a second 3D depth map includes the device identifying information, and the first and second 3D depth maps are generated by a single camera located in respective first location and second locations.

4. The device of claim 1, wherein the information useful for generating a second 3D depth map includes an image of the first device taken by the second device.

5. The device of claim 1, wherein the instructions are executable to:
    receive from at least one of the second and third devices information useful for generating a third 3D depth map including an image of the first device; and
    generate an aggregate 3D depth map using the first, second, and third 3D depth maps.

6. The device of claim 1, wherein the instructions are executable to:
    determine a distance to a device corresponding to an image in the first 3D depth map at least in part based on a size of the image.

7. The device of claim 1, wherein the instructions are executable to:
    alter aspects of images in the first and second 3D depth maps for a reference location to render altered images in the aggregate 3D depth map.

8. An assembly comprising:
    plural computerized devices;
    each computerized device comprising at least one laser emitter configured to output signals useful for generating at least one three dimensional (3D) depth map;
    a first one of the computerized devices being programmed with instructions to:
    generate, using the first device, at least a first image of second and third devices in a field of view of a camera;
    the first image being a first 3D depth map;
    receive from at least one of the second and third devices information useful for generating a second 3D depth map including an image of the first device; and
    generate an aggregate 3D depth map using the first and second 3D depth maps.

9. The assembly of claim 8, wherein the instructions are executable to:
    exchange device identifying information with the second and third devices.

10. The assembly of claim 8, wherein the information useful for generating a second 3D depth snap includes the device identifying information, and the first and second 3D depth maps are generated by a single camera located in respective first location and second locations.

11. The assembly of claim 8, wherein the information useful for generating a second 3D depth map includes an image of the first device taken by the second device.

12. The assembly of claim 8, wherein the instructions are executable to:
    receive from at least one of the second and third devices information useful for generating a third 3D depth map including an image of the first device; and
    generate an aggregate 3D depth map using the first, second, and third 3D depth maps.

13. The assembly of claim 8, wherein the instructions are executable to:
    determine a distance to a device corresponding to an image in the first 3D depth map at least in part based on a size of the image.

14. The assembly of claim 8, wherein the instructions are executable to:
    alter aspects of images in the first and second 3D depth maps for a reference location to render altered images in the aggregate 3D depth map.

15. A method comprising:
    generating, using a first device, at least a first image of second and third devices in a field of view of a camera;
    the first image being a first 3D depth map;
    receiving from at least one of the second and third devices information useful for generating a second 3D depth map including an image of the first device; and
    generating an aggregate 3D depth map using the first and second 3D depth maps.

16. The method of claim 15, comprising:
    exchanging device identifying information with the second and third devices.

17. The method of claim 15, wherein the information useful for generating a second 3D depth map includes the device identifying information, and the first and second 3D depth maps are generated by a single camera located in respective first location and second locations.

18. The method of claim 15, wherein the information useful for generating a second 3D depth map includes an image of the first device taken by the second device.

19. The method of claim 15, comprising:
    receiving from at least one of the second and third devices information useful for generating a third 3D depth map including an image of the first device; and
    generating an aggregate 3D depth map using the first, second, and third 3D depth maps.

20. The method of claim 15, comprising:
    altering aspects of images in the first and second 3D depth maps for a reference location to render altered images in the aggregate 3D depth map.

* * * * *